UNITED STATES PATENT OFFICE.

HENRY BALEN WALKER, OF NEW YORK, N. Y.

IMPROVEMENT IN SILVERING GLASS AND IN PROTECTING THE SAME.

Specification forming part of Letters Patent No. 97,838, dated December 14, 1869.

*To all whom it may concern:*

Be it known that I, HENRY BALEN WALKER, of the city, county, and State of New York, have invented a new and Improved Mode of Silvering Glass for Mirrors and Reflectors, and protecting the silvering upon the glass; and I hereby declare the following is a full, complete, and exact description of the same; also, the practical operation of the same, for the purposes claimed.

To enable others skilled in the arts to make and use my invention, I proceed to describe its operation and construction in the formation of the chemical compounds, and their use and application.

I form a chemical compound composed of the following ingredients, of the specified quantities, to wit:

First, twenty-four ounces of nitrate of silver, nineteen or twenty ounces of concentrated liquid ammonia. These are mixed together in a vessel, and left to stand for twelve hours. Then add one hundred and twenty ounces of distilled water, mix thoroughly, and then filter through paper.

Second, I form a second chemical compound of the following ingredients, of the specified quantities, to wit: One ounce crystallized tartaric acid. Add to this eight ounces of distilled water. Let this stand for three or four months before using. Filter it through paper.

Third, take four and one-half ounces of the first solution or compound, to which add one ounce of the second solution or compound, and to which add twenty-two ounces of distilled water, when the compound is ready for use.

To prepare the glass for the silvering process, I cover the surface with a coat of whiting, rubbed on with a piece of flannel cloth, which is afterward rubbed off with a piece of chamois-skin. Then apply a second coating of whiting, as before. Then polish it with a block covered with felt or fine French carpet, adding to the coat of whiting a small quantity of the oxide of iron or tin.

After being polished, the surface is washed with water, and then rinsed with distilled water, when the glass is prepared for silvering. The glass is then placed upon a cast-iron steam-table, formed of a large iron box filled with water, through which several steam-pipes are passed, which, being filled with steam, generate a uniform heat upon the surface of the table upon which the glass rests, the heat being raised to about from 110° to 130°.

After raising the temperature of the glass to the above degree of heat, the last chemical compound or solution is poured upon the surface of the glass plate, sufficient to spread over the entire surface, which it will readily do when being poured on. After the solution or compound has remained upon the glass half an hour, the silver having precipitated upon the glass, the surface is then washed with distilled water, and set to dry, when the silvering process is completed.

To protect the silvering thus put on, I proceed to cover it with a solution or compound of one ounce of shellac and ten ounces of ninety-five per cent. alcohol, over which I spread a coating or compound of red lead and litharge, ground in oil, thus forming a mirror superior in luster and reflective power to the usual mode of silvering glass, and at a much less expense to manufacture.

The invention consists, and what I claim as novel consists, in—

Forming a chemical compound, consisting of nitrate of silver, concentrated liquid ammonia, crystallized tartaric acid, and distilled water, prepared and compounded in quantities and proportions substantially as above described, and in the manner of its application for the uses and purposes aforesaid; and also the compound or solution of shellac and alcohol, in the quantities and proportions as above described, and the compound of litharge, red lead, and oil, forming the outer coating, substantially as above described.

HENRY BALEN WALKER.

Witnesses:
AUG. F. BAYS,
W. S. HORNFAGER.